(12) United States Patent
Kholodkov et al.

(10) Patent No.: US 12,217,045 B2
(45) Date of Patent: Feb. 4, 2025

(54) NEGATIVE NUMBERING TO LOG WEB SERVICE UPDATE ATTEMPTS

(71) Applicant: Microsoft Technology Licensing, LLC, Redmond, WA (US)

(72) Inventors: Dmitry Valentinovich Kholodkov, Sammamish, WA (US); Rahul Nigam, Bothell, WA (US); Nidhi Verma, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 18/296,288

(22) Filed: Apr. 5, 2023

(65) Prior Publication Data
US 2024/0338196 A1 Oct. 10, 2024

(51) Int. Cl.
*G06F 8/65* (2018.01)
*G06F 8/71* (2018.01)
*H04L 41/082* (2022.01)

(52) U.S. Cl.
CPC ............ *G06F 8/65* (2013.01); *G06F 8/71* (2013.01); *H04L 41/082* (2013.01)

(58) Field of Classification Search
None
See application file for complete search history.

(56) References Cited

U.S. PATENT DOCUMENTS

| 6,389,589 | B1 * | 5/2002 | Mishra | G06F 8/61 |
| | | | | 709/219 |
| 11,487,528 | B1 * | 11/2022 | Spiegelman | G06F 8/71 |
| 12,020,015 | B2 * | 6/2024 | Kholodkov | G06F 8/65 |
| 12,032,942 | B2 * | 7/2024 | Verma | G06F 8/65 |
| 2020/0019400 | A1 * | 1/2020 | Zhao | G06F 11/302 |

* cited by examiner

*Primary Examiner* — Marina Lee
(74) *Attorney, Agent, or Firm* — NovoTechIP International PLLC

(57) ABSTRACT

A logging system for an orchestration system that implements a rollout service to deploy updates to a cloud service includes: an orchestrator service host computer hosting the rollout service; a service bus connecting the orchestrator service host computer with a network on which the cloud service is provided; and a database to which the rollout service records a log of a deployment of an update, the log comprising an entry for each of a number of subsets of network components supporting the cloud service. Each record in the log refers to a payload version deployed to a corresponding subset of the network components supporting the cloud service. In response to detection of an issue with the deployment of the update in a particular subset of the network components, the rollout service retains a record in the log of each payload version deployed by changing a payload version number to be negative in each record of the log prior to a restart of the deployment back to an earlier subset of the network components with a new payload version to avoid the issue.

20 Claims, 13 Drawing Sheets

FIG. 4D

| PayloadId | PolicyId | PayloadVersion | StageId | RingId | StageState |
|---|---|---|---|---|---|
| 2627951 | 201 | 1 | 1 | 2 | Cancelled |
| 2627951 | 201 | 2 | 2 | 3 | Cancelled |
| 2627951 | 201 | 3 | 3 | 3 | Cancelled |
| 2627951 | 201 | 4 | 4 | 3 | Cancelled |
| 2627951 | 201 | 5 | 5 | 3 | Cancelled |
| 2627951 | 201 | 6 | 2 | 2 | Cancelled |
| 2627951 | 201 | 7 | 1 | 2 | Finished |
| 2627951 | 201 | 8 | 2 | 3 | Finished |
| 2627951 | 201 | 9 | 3 | 3 | Finished |
| 2627951 | 201 | 10 | 4 | 3 | Finished |
| 2627951 | 201 | 11 | 5 | 3 | Finished |
| 2627951 | 201 | 12 | 6 | 3 | Finished |
| 2627951 | 201 | 13 | 7 | 3 | Finished |

NEGATIVE NUMBERING TO LOG WEB SERVICE UPDATE ATTEMPTS

BACKGROUND

Cloud-based services are services provided to users over a computer network, such as the Internet or a Local Area Network (LAN). Cloud-based services may provide processing resources, analytics, storage, and network resources to customers. These services may include, but are not limited to applications for creating, consuming, and/or modifying content, file storage and management platforms, collaboration and communications platforms, and other types of software as a service (SaaS).

The architecture of a typical cloud-based service includes numerous servers, network devices, and storage elements to support the services provided. These devices include software, data, and configuration files that need to be periodically updated to add new features, to roll out fixes to software and/or to the configuration. Additionally, some services may support agent software installed on the client devices, and this software may also need to be updated to a newer version to support added features and/or to fix problems associated with a current version.

However, issues may arise when an update is being deployed. Administrators of the cloud service will want to study the issues that arise during an update so as to improve the cloud service and the update process.

SUMMARY

An example logging system for an orchestration system that implements a rollout service to deploy updates to a cloud service includes: an orchestrator service host computer hosting the rollout service; a service bus connecting the orchestrator service host computer with a network on which the cloud service is provided; and a database to which the rollout service records a log of a deployment of an update, the log comprising an entry for each of a number of subsets of network components supporting the cloud service. Each record in the log refers to a payload version deployed to a corresponding subset of the network components supporting the cloud service. In response to detection of an issue with the deployment of the update in a particular subset of the network components, the rollout service retains a record in the log of each payload version deployed by changing a payload version number to be negative in each record of the log prior to a restart of the deployment back to an earlier subset of the network components with a new payload version to avoid the issue.

A method of logging deployment of an update to a cloud service includes: deploying the update to a next subset of component supporting the cloud service; detecting whether there is an issue with deployment of the update in that subset; in response to detecting an issue, transitioning to a restart including marking a payload version as negative in each record in a log of the deployment prior to the restart; and restarting the deployment at an earlier subset of components that had previously received a different payload version of the update.

A non-transitory computer readable medium, the medium comprising programming instructions that, when executed by a processor of an orchestrator service, cause the processor to log deployment of an update to a cloud service by: deploying the update to a next subset of component supporting the cloud service; detecting whether there is an issue with deployment of the update in that subset; in response to detecting an issue, transitioning to a restart including marking a payload version as negative in each record in a log of the deployment prior to the restart; and restarting the deployment at an earlier subset of components that had previously received a different payload version of the update.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A is a snapshot of the log at a time when an issue is encountered with an update deployment. FIG. 4B is a subsequent snapshot of the same log after a restart of the deployment has occurred in response to the issue encountered in FIG. 4A.

FIG. 4D depicts a log of deployment of an update that is kept at a farm level according to principles described herein.

FIGS. 6A and 6B depict logs analogous to those of FIGS. 4A and 4B but using a different technique to account for records following a restart of the deployment.

DETAILED DESCRIPTION

Figure 1:
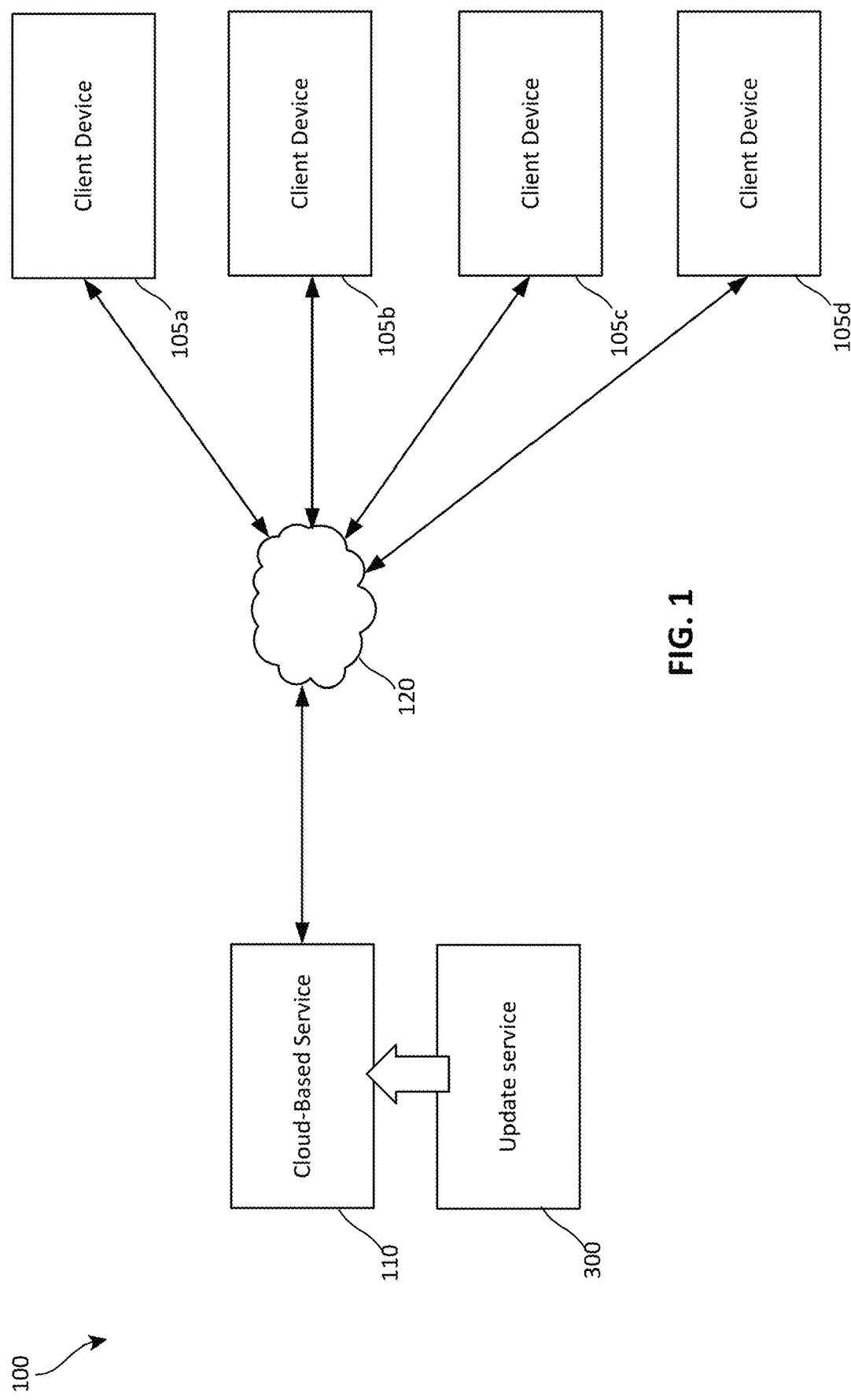
FIG. 1 is a diagram showing an example computing environment in which the techniques disclosed herein may be implemented.

As noted above, a cloud service may be regularly updated, for example, to add new features, improve function, or fix bugs or other errors. In some large-scale cloud services, there may be hundreds of changes being implemented each minute. While many of the changes are minor, some are significant changes. Any change has the potential to cause unintended and adverse effects on or within the cloud service. When an update causes an adverse impact on the users or administrators of the cloud service, this is referred to as a regression.

Updates are typically rolled out in multiple stages to different groups of users. This can mitigate the risk that unintended negative side effects may result when deploying the new version of the software and/or configuration data. This approach is referred to as ring deployment in which the deployment process is represented by an expanding series of rings, where each ring includes deploying the update to a larger subset of the userbase. Thus, for each successive ring, the software and configuration that support a corresponding subset of the userbase is updated. Each ring may also be further subdivided into a number of stages, each representing a subset of the userbase of that ring. The update may be sequentially applied to each stage within the ring, just as each ring sequentially receives the update. In this way, if problems are encountered, the problems can be limited to a subset of the userbase rather than potentially affecting the entire userbase. User feedback and telemetry data may be collected from users associated with each stage or ring to determine whether the new version of the software is operating correctly before deploying the updates to the next stage or ring. This process may continue until the update is deployed across the entire userbase.

Sometimes, an update that is successful in the environment of a first stage will have an issue or fail in the specific environment of a later stage. When such an issue occurs, the update system may backup and retry implementation of the update in one or more stages where it previously failed. In some cases, the deployment will start over entirely, returning to deployment in the first ring and stage.

With any restart, some adjustments to the update may be made as deployment is retried so as to adapt to the environment of a specific stage where the issue was encountered. For example, there may be a change to a configuration or metadata of the update that is needed due to the specific environment of a particular stage so that the update can be successfully deployed in that stage. This may happen multiple times during a deployment, even multiple times in a single stage. For example, there may be multiple problems with an update. After a first problem is resolved, the update may again fail due to a second issue that is still present. Thus, retrying the update may be iterated multiple times within a single stage or over several stages as various attempts are needed to successfully deploy the update.

Being able to track the failed attempts and deployment retries can enable service administrators to improve the service and the rollout of future updates. However, current systems usually do not retain log data for all such attempts and adjustments to deploy the update in the various stages. This means that a subsequent audit to determine why or how some stages of the update failed cannot be fully performed. As a result, the deployment of updates generally cannot be improved by learning from these previous issues. This is a technical problem for web service administrators who would want a more complete picture and log data of everything that happened during the recent update, including stage failures and retry attempts.

Accordingly, the present application provides a technical solution to this technical problem by, for example, adjusting the update logging process to retain a more complete record of the failed attempts and update retries among the various stages, even if the update has to be retried or redeployed multiple times to a particular stage or set of stages. Typically, the log or audit data for an update is stored in a table or tabular format. This format does not readily allow for the tracking of restarts and retries unless new tables, additional columns or similar features expand the data being tracked in the table. To avoid any such need to complicate the log table, the present specification describes the use of negative vectoring or negative numbering within the table to track and retain any number of retries when deploying an update in a sequence of stages.

FIG. 1 is a diagram showing an example computing environment 100 in which the techniques for logging updates to cloud-based services are implemented including a more complete record of failed attempts and update retries among the various stages, even if the update has to be retried or redeployed multiple times to a particular stage or set of stages. The computing environment 100 includes a cloud-based service 110 that provides any of the services discussed below or any other cloud-based service to clients. The example computing environment 100 also includes one or more client devices, such as the client devices 105a, 105b, 105c, and 105d, referred to collectively at client devices 105. The client devices 105 communicate with the cloud-based service 110 via the network 120. The network 120 may be a dedicated private network or the combination of public and private networks commonly referred to as the Internet.

In the example shown in FIG. 1, the cloud-based service 110 is implemented as a single cloud-based service or set of services. These services may include, but are not limited to, applications for creating, consuming, and/or modifying content, file storage and management platforms, collaboration and communications platforms, and other types of software as a service (SaaS). The cloud-based service 110 may include numerous servers, network devices, storage elements and other components to support the various services that are provided by the cloud-based service. Logically, the cloud-based service can include different groups of virtual machines referred to as farms. Each farm may serve a specific corresponding segment of the userbase. Physically, the farms are supported by one or more computer servers configured to provide computational and/or storage resources for the virtual machines of the cloud-based service 110.

Each farm may be configured to provide fail-over protection so that, if a virtual machine or computer server within the farm experiences a failure, the tasks assigned to that unit are handed off to another unit within the farm. The farm may also be configured such that one or more machines are taken offline temporarily to facilitate updates to the software and/or configuration data. For example, in a farm of 200 virtual machines, only 20 virtual machines may be updated at a time while the other machines continue to provide service. This continues until the entire farm is updated. Other architectures are also possible.

A deployment policy generated for an update to the cloud-based service 110 accounts for the specific architecture and configuration of the virtual and hardware components involved. Furthermore, the cloud-based service 110 may also include other hardware and software to support various processes and services that support and maintain the various components of the cloud-based service 110.

The client devices 105 are computing devices that can be implemented as a portable electronic device, such as a mobile phone, a tablet computer, a laptop computer, a portable digital assistant device, a portable game console, and/or other such devices. The client device 105 can also be implemented in computing devices having other form factors, such as a desktop computer, vehicle onboard computing system, a kiosk, a point-of-sale system, a video game console, and/or other types of computing devices. While the example implementation illustrated in FIG. 1 includes four client devices, other implementations may include any number of client devices that utilize the cloud-based service 110. Furthermore, some features of the services provided by the cloud-based service 110 can be implemented with a native or agent application installed on the client device 105. The native application may communicate with the cloud-based service 110 over a network connection to exchange data with the cloud-based service 110 and/or to access features implemented on the cloud-based service 110.

As noted above, the cloud-based service 110 will regularly receive any number of updates to support and improve operations. Updates may be made to implement new features in the service or to fix issues occurring in the service. These updates may be of several types. For example, updates may be made to the control layer, to the microservices or code, or to the configuration of the cloud-based service 110 or any of its underlying components. Code changes are also referred to as binary changes. As shown in FIG. 1, an update service 300, also referred to as an orchestrator, applies updates to the cloud-based service 110.

However, making any update to the service 110 can have unintended and unforeseen consequences. For example, a feature that was previously working may stop working due to a conflict in an update. In some examples, the entire service may stop functioning due to a faulty update. In other examples, the service may simply function more slowly after an update. Any adverse impact on the users, administrators, or useability of the cloud-based service 110 is known as a regression. One issue with regressions is that different cloud-based services support different clients with different levels of criticality. For example, a cloud-based service supporting operations at a hospital may have life-threatening consequences if a regression is experienced. Whether a regression is life-threatening or less critical, operators of the service 110 will strive to minimize the impact of any regression on users of the service 110. Consequently, as will be described below, the update service 300 is structured to safely apply updates to the cloud-based service 110. In different examples, this includes automatically recognizing and mitigating regressions that may occur.

Figure 2A:
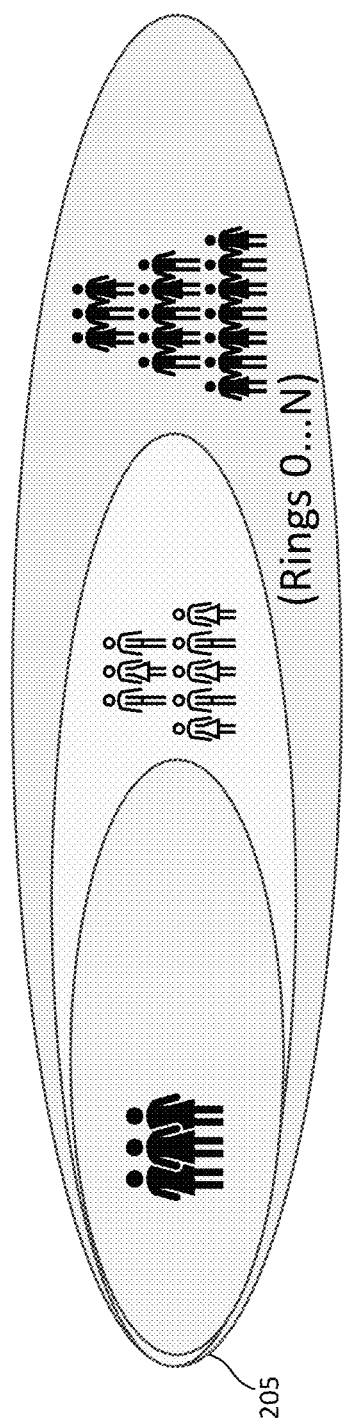
FIGS. 2A and 2B are diagrams showing example ring configurations for deploying updates on a cloud-based service architecture.

One mechanism for reducing the impact of any regression is a staged or ring-based deployment of the update. FIG. 2A is a diagram showing a representation of a ring configuration 205 for deploying updates on a cloud-based architecture, such as that of the cloud-based service 110 shown in FIG. 1. Each ring may be associated with a number of users of the services provided by the cloud-based service 110. The number of users associated with each subsequent ring usually increases until the entire userbase has access to the updates that are being deployed. The number of rings associated with a particular deployment may depend upon the specific update to be deployed, the architecture of the cloud-based service 110, the risk associated with the specific update, and/or other factors that will be discussed in detail in the examples which follow.

The cloud-based service 110 may be configured to receive telemetry data associated with the updated software and/or user feedback data indicative of the performance of the updates as the updates are deployed to each ring. The cloud-based service 110 may be configured to halt further deployment of the updates in response to the telemetry data and/or the user feedback data indicating that the updates are not operating as expected. Otherwise, the cloud-based service 110 will expand the rollout to the next ring in response to telemetry data and/or user feedback indicating that the updates appear to be operating correctly.

Each ring may include a subset of farms, servers and/or other components onto which the updates are deployed to provide the selected subset of users associated with each ring the updates. Furthermore, the rings earlier in the sequence of rings may include users that are specially selected for initial testing of the updates. For example, users associated with a company or other organization that provides the cloud-based service 110, and employees or other users associated with the company or organization may be included in the original ring or the earlier rings in the sequence. The rings may also be subdivided into multiple stages. Each stage may include a subset of the userbase. The deployment framework provided herein may be configured to selectively deploy specific versions of the update to specific rings and/or to stages of the rings based on the deployment policy associated with the update.

The term "build" refers to a collection of updates being deployed together as a package. Different builds may be deployed to different rings and/or stages of rings to provide certain features to certain users of the userbase. For example, certain users may have access to a version of an application that has certain features that may not be provided in other versions of the application. Furthermore, certain features may not be available to users in certain regions for legal or compliance reasons. For example, privacy laws may prohibit the collection of certain types of telemetry data from the client devices 105 of the user, and the version of the update deployed to such regions omits the functionality associated with the prohibited types of telemetry data. These examples illustrate how the deployment policy for an update may be customized so that the deployment framework can deploy different versions of a build to different rings and/or stages of the rings.

Figure 2B:
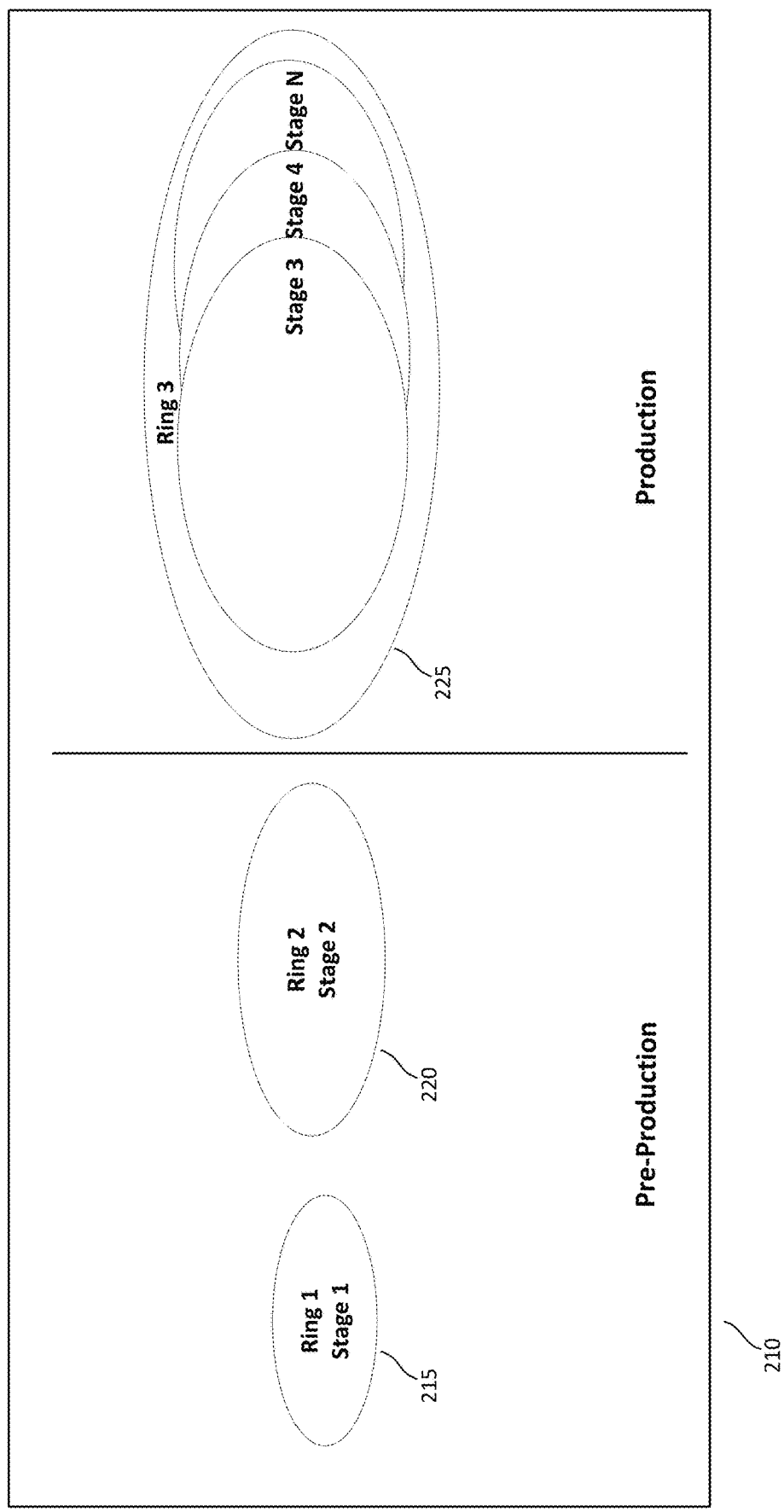

FIG. 2B is a diagram showing a representation of another example ring configuration 210 for deploying updates on a cloud-based architecture, such as that of the cloud-based service 110 shown in FIG. 1. The ring configuration 210 includes three rings 215, 220, and 225. In this example configuration, the first ring 215 and the second ring 220 are associated with users in a pre-production environments in which the updates are initially tested. The pre-production environment refers to an environment internal to a provider of the cloud-based service where updates can be deployed and tested before being exposed to customers of the cloud-based service. Subsequently, in the production environment, users who are customers of the organization that provides the cloud-based service are provided access to the updates.

In the illustrated example, the first ring 215 is associated with a first internal group of users associated with the organization. These users may include members of the development team, testing team, and/or others who have been selected as a first set of users to receive and utilize the update. The computing devices of the users and/or components of the cloud-based service 110 may provide telemetry data. The users themselves may be prompted by the cloud-based service 110 to provide feedback on the update. This telemetry data and/or the user feedback are analyzed to determine whether the updates are operating as expected. The cloud-based service 110 may halt the deployment to the subsequent rings of the ring configuration 210 in response to determining that the updates are not operating as expected. Otherwise, the deployment process may continue with deploying the updates.

In the example shown in FIG. 2B, the updates are next rolled out to additional users within the preproduction environment. In this example, the organization has many employees who are also users of the services provided by the cloud-based service 110. For example, the first ring 215 includes approximately 20,000 users, and the second ring 220 includes approximately 100,000 users associated with the organization. The preproduction environment in this example may be implemented on a separate farm or set of farms than the production environment, and the updates may initially be deployed to the server or servers associated with the preproduction environment. In other implementations, the same farms or servers provide services to both the preproduction and production environments, and users are directed to the appropriate version of the software based on the group with which the users are associated. Telemetry and user data are collected from the users associated with the second ring 220, and the cloud-based service 110 may halt the deployment to the subsequent rings of the ring configuration 210 in response to determining that the updates are not operating as expected. Otherwise, the deployment process may continue with deploying the updates to the third ring 225.

The third ring 225 includes users that are using one or more production versions of the application or applications provided by the cloud-based service 110. Thus, the third ring 225 includes users that are outside of the organization and are customers who subscribe to the services provided by the cloud-based service 110. The third ring 225 may include a very large number of users. In this example, the third ring 225 may include millions or even billions of users. Thus, the third ring 225 may be further subdivided into stages, and each stage includes a subset of the users that make up the third ring 225. These stages are used to gradually roll out the updates to the full userbase and to provide another opportunity to collect and analyze telemetry data and/or user feedback from a broader userbase before deploying the updates to all users. Furthermore, each of the stages may represent internal ring boundaries used to subdivide the production userbase into logical groupings of users that utilize a specific production version. As discussed above, these subgroups of users may be determined based on the functionality available to the users within a particular subgroup.

Certain users may receive certain features that are not available to users in other subgroups. Some users may have access to customized version of the software for a particular corporation or other organization and/or may have licensed a premium version of the application or applications provided by the cloud-based service 110 that include additional features. The subgroups may also be based on legal considerations. As discussed in the preceding examples, certain features of the application or applications may be precluded from certain countries or regions due to legal requirements, and the version of the update deployed to such regions will not include these features. Whereas the example shown in FIG. 2B includes three rings, other implementations may utilize a different number of rings based on the size of the userbase, complexity, and risk associated with the deployment.

Figure 3A:
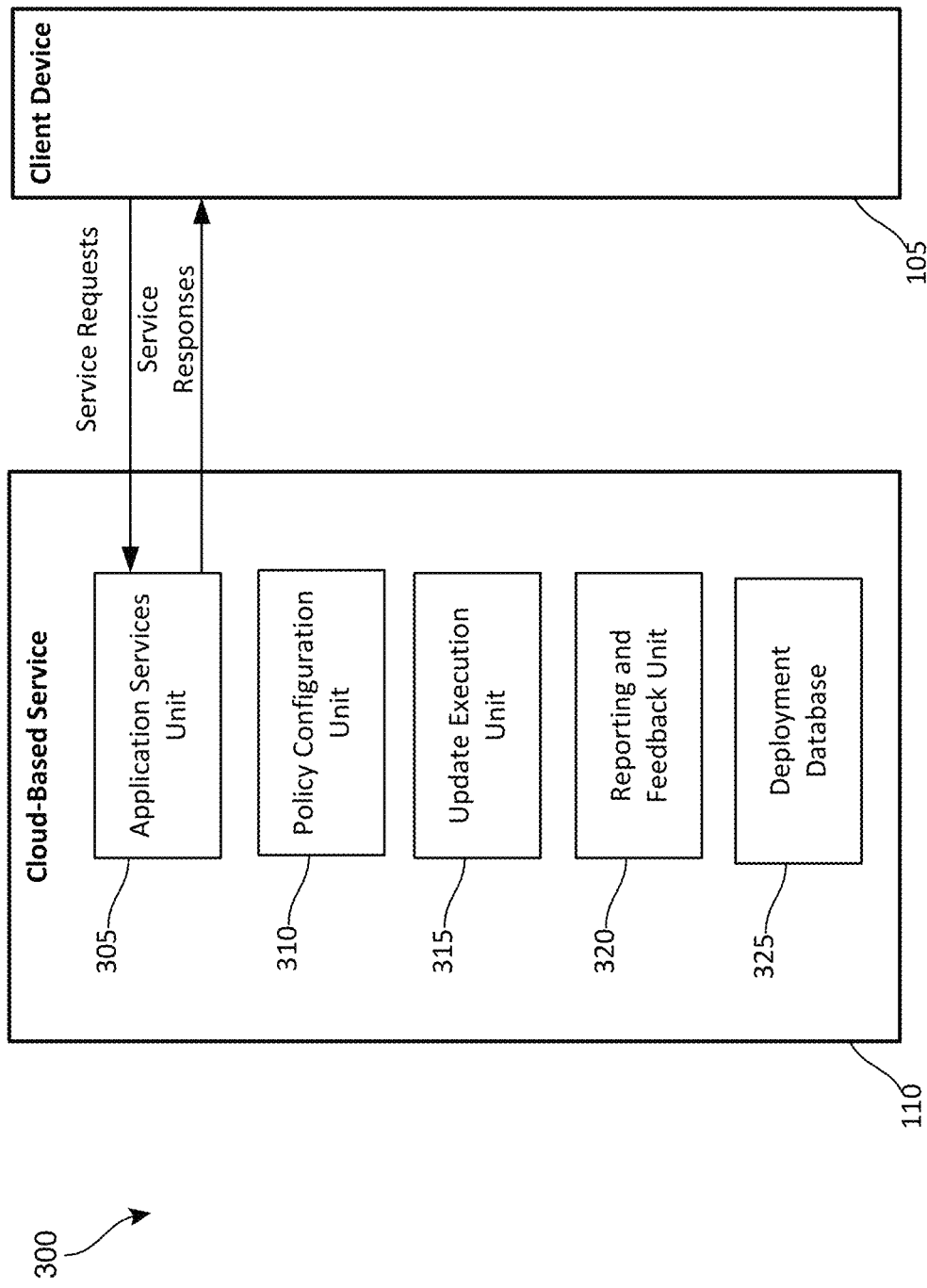
FIG. 3A is a diagram showing additional details of the update execution unit of the cloud-based service 110 of FIG. 1.

FIG. 3A is an example architecture for an update service 300 that may be used, at least in part, to implement the cloud-based service 110. The cloud-based service 110 includes an application service unit 305, a policy configuration unit 310, an update execution unit 315, a reporting and feedback unit 320, and a deployment database 325.

The application service unit 305 is configured to provide the various services offered to customers of the cloud-based service 110. The application service unit 305 is configured to receive service requests from the client devices 105 of users and to provide service responses to the client devices 105 of the users. The specific types of services provided by the cloud-based service 110 may vary. These services may include but are not limited to providing applications for creating, consuming, and/or modifying content, file storage and management platforms, collaboration and communications platforms, and other types of SaaS.

The policy configuration unit 310, the update execution unit 315, the reporting and feedback unit 320, and the deployment database 325 are configured to provide the policy generation and execution functionality described herein. In the example shown in FIG. 3A, the policy generation and execution functionality are implemented on the cloud-based service 110 for which these functions are being performed. In other implementations, the deployment policy generation and execution functionality may be provided, at least in part, by separate services.

The policy configuration unit 310 is configured to receive a build policy configuration information about the update to be deployed. The cloud-based service 110 may provide a user interface in which an administrator provides information about the build. This user interface is illustrated and described as element 317 in FIG. 3B. The user interface may include options for specifying one or more target rings and/or stages of the one or more rings. The user interface may also provide means for inputting when the update should be deployed. The deployment of the update may be scheduled to be deployed immediately or on a specific day or time. The scheduling feature may be useful for deploying updates that include new features that are to be made available to users on a specific date. The user interface may also provide means for selecting the payload of the update to be deployed. The payload may include executable program content, scripts, and/or configuration data that may be deployed as part of the update. The payload may include multiple new features and/or fixes for problems. The policy configuration unit 310 creates a deployment policy for the build based on the information provided by the administrator via the user interface. The update execution unit 315 is configured to execute the deployment policies generated by the policy configuration unit 310.

The reporting and feedback unit 320 is configured to receive telemetry data from components of the cloud-based service 110 and/or client devices 105 of users. The reporting and feedback unit 320 may be configured to analyze the telemetry data and/or user feedback received to generate reports that show the performance of the update that has been deployed based on the analyzed data. The feedback unit 320 may also automatically perform various actions in response to determining that the updates are not performing as desired.

The deployment database 325 is a database configured to store deployment policy information generated by the policy configuration unit 310 and data associated with the execution of the deployment policy. The deployment database 325 records for a deployment policy may include the location and/or file names of the payload to be deployed as the updates.

Figure 3B:
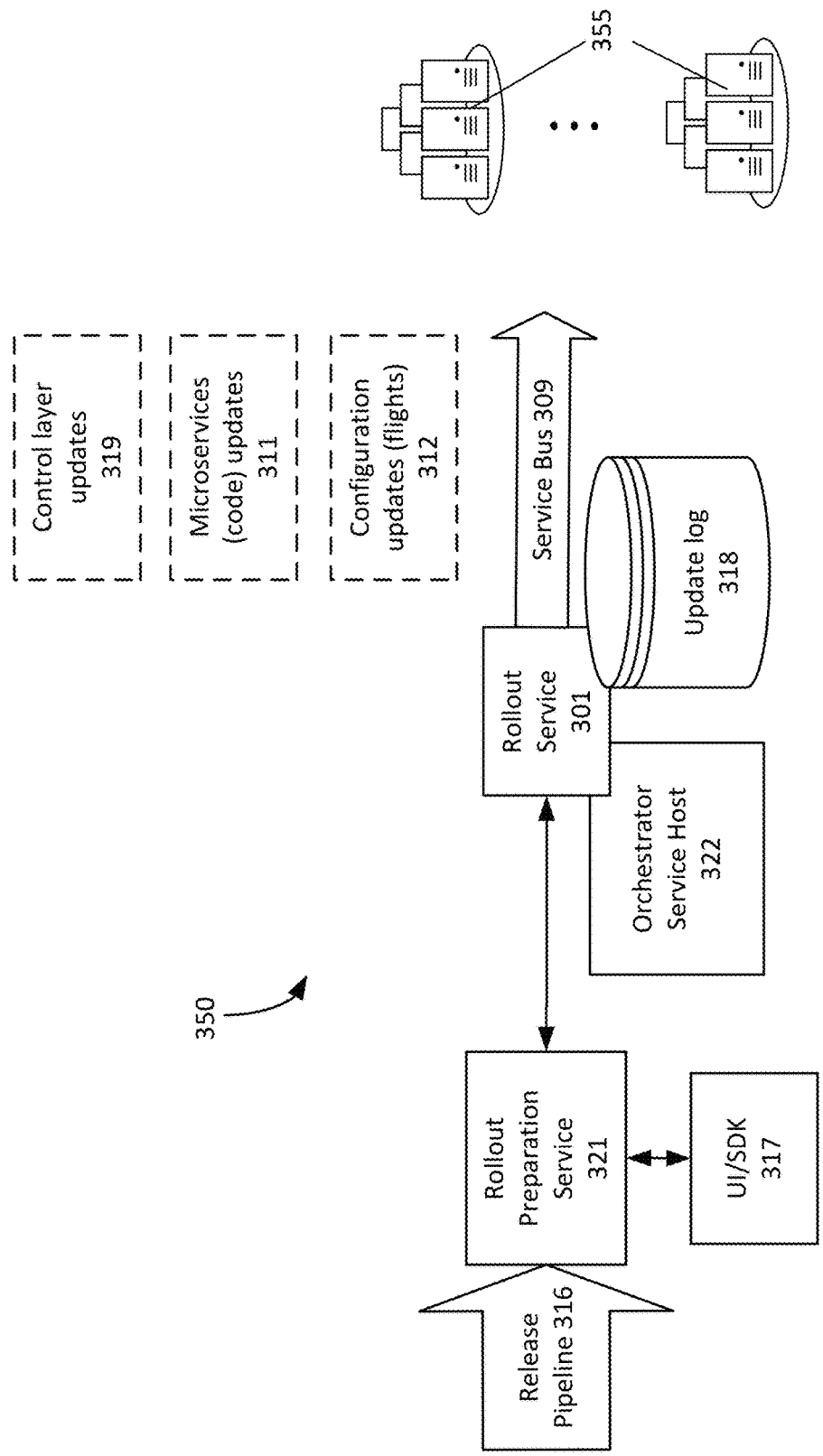
FIG. 3B is an example architecture that may be used, at least in part, to implement the cloud-based update service shown in FIG. 1.

FIG. 3B is an example architecture 350 of the update service mentioned above with respect to FIGS. 1-3A. As shown in FIG. 3B, a release pipeline 316 provides the updates to be implemented to a cloud-based service. Any number of developers may be working on different aspects of the cloud-based service and may submit updates via the pipeline 316.

A rollout preparation service 321 receives the updates from the pipeline 316. The service 321 may package a number of updates together for a single rollout. This may be referred to as a build. A user or administrator may operate a user interface 317, including a software development kit (SDK), to control the operation of the rollout preparation service 321 and the packaging or organization of the updates to be rolled out together in a specific build.

When prepared, the build is provided to a rollout service 301 for deployment. This rollout service 301 is also referred to as an orchestrator service and is hosted on a computer system with processing and memory resources that is referred to as the orchestrator service host computer or machine 322. The host 322 connects to a network interface including a service bus 309. Thus, the orchestrator or rollout service 301 includes both software and hardware for implementing an update to the cloud service as described herein. In some examples, the orchestrator service host machine 322 includes a server, or a number of servers, with an interface to the network on which the cloud service is provided.

As will be described in more detail below, the rollout service 301 has a database in which is kept a log 318 of the update as it is deployed. The log 318, as described herein, can be on a stage-by-stage basis, a farm-by-farm basis or even machine-by-machine. Each of the components illustrated in FIG. 3B may be implemented on the same number of servers or devices as the rollout service 301 or different networked machines as illustrated.

The rollout service 301 will deploy the update via the service bus 309 which is part of the network interface between the rollout service 301 and the network on which the cloud service is provided. The service bus 309 includes the network connecting all the components of the cloud service, for example, a Local Area Network covering the data center or server farm(s) that support the cloud service, a similar Wide Area Network or the internet. As noted above, the updates may be of different types including control layer updates 319, microservices or code updates 311 and configuration updates 312, also referred to as flights.

The component supporting the cloud service may be a number of farms 355. In this example, each farm is a collection of virtual machines supported on some number of servers or other machines of the network. For example, a farm 355 may include 200 virtual machines. When a farm is updated, a subset of the virtual machines, e.g., 10 may be taken offline and updated at a time. Thus, some number of the virtual machines in the farm will be running the old software while some others will be running the updated software until the update of the farm is fully completed.

Figures 4A, 4B, 4C:
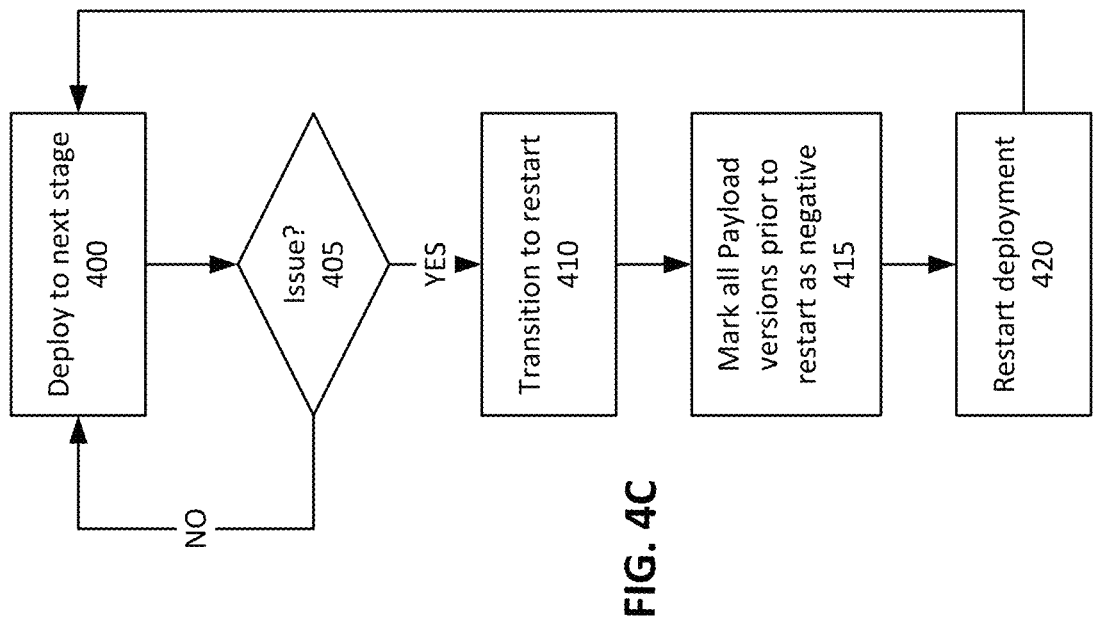
FIGS. 4A and 4B depict an update log kept according to principles described herein.
FIG. 4C is a flowchart depicting a method of keeping the log according to the principles illustrated in FIGS. 4A and 4B.

Referring to FIG. 4A and the following figures, the logging of an update deployment will be described according to the principles of the present disclosure. FIGS. 4A and 4B depict an update log kept according to principles described herein. FIG. 4A is a snapshot of the log at a time when an issue is encountered with an update deployment. FIG. 4B is a subsequent snapshot of the same log after a restart of the deployment has occurred in response to the issue encountered in FIG. 4A.

Specifically, FIG. 4A depicts a log table in which rollout of the update is being logged. As shown, the payload being deployed is identified with a payload identification (PayloadID). For simplicity, the Payload ID in the illustration is "1." The policy associated is indicated with a policy identification (PolicyID). For simplicity, the PolicyID in the illustration is "1." FIG. 4A also shows that the update has, so far, been made through the first five stages of deployment, shown by the stage identification, i.e., StageID 1-5. Consistent with FIG. 2B, the ring identification (RingID) column shows that stage 1 was in ring 1, stage 2 was in ring 2, and stages 3-5 are in ring 3. In each stage, there may be a different payload version (PayloadVersion) that accounts for adjustments in configuration, settings, metadata, etc. of the payload for the environment of a specific stage.

In the example being illustrated, an issue with deployment of the update has occurred in stage 5. As a result, the deployment will be restarted, as follows. As used herein and in the appended claims, the term "restart" or "restarted" means that the deployment of the update returns to an earlier subset or segment, e.g. an earlier stage, of the components supporting the cloud service where the update was already deployed and restarts the deployment at that point. This may be at the very beginning, e.g., stage 1, ring 1, but may also revert to an earlier point that is not all the way to the very beginning. The restart is executed as follows. First, there will be a period of time to transition to the restart. This transition is represented as the next two lines shown in FIG. 4B, i.e., PayloadVersions −6 and −7. The transition period, represented by PayloadVersion −6 and −7, provides time for the rollout service to take the actions and issue the notifications necessary to deactivate the payload where previously deployed as needed to retry the deployment again from the earlier restart point In the example of FIG. 4B, following this transition, the deployment will restart in ring 1, stage 1 with a new payload version, i.e., PayloadVersion 8. This is the next line in the table of FIG. 4B. In the log table, all of the payload versions listed prior to the restart are given or changed to negative numbers as shown in FIG. 4B. Consequently, a record of both deployment attempts in ring 1, stage 1, for example, is retained in the table. The first is PayloadVersion −1 and the second is PayloadVersion 8. Similarly, the stage where the issue was detected, ring 3, stage 5, has a record of both deployment attempts in the table at PayloadVersion −5 and PayloadVersion 12. Each entry in the table can correspond to a record of the actual state of the cloud service at that stage of the update deployment.

As will be appreciated, the restart technique described in connection with FIGS. 4A and 4B can be iterated any number of times to account for multiple restarts from any point in the update deployment, even multiple restarts from the same stage. Any record of a stage deployment prior to the most recent restart will be indicated by a negative PayloadVersion number.

This design option utilizes a dual data management approach with item state mapping and payload version in negative increments. This dual cancellation indicator is designed to prevent unintended work item updates from causing asynchronous processes and tracking the status of items that are re-applied to the target farms/objects. As illustrated, the technique provides the history of the initial advancement and the progress of the restarted payload with incrementing of payload version.

FIG. 4C depicts a flowchart illustrating the technique being described. As shown in FIG. 4C, once deployment of an update begins or as deployment continues, the update is deployed to a next stage 400. It is then determined whether there is an issue with the update in that stage 405. If not, deployment proceeds to the next stage using the next payload version for that stage. This loop continues until an issue is encountered or all stages have been successfully deployed.

When an issue is encountered, as described above, some time is required to transition to a restart 410. In the rollout log, all payload versions prior to the restart, including any activity during the transition, are marked as negative 415. The deployment is then restarted 420. This includes deploying a new revised payload version to the next stage at the point of the restart, e.g., stage 1, ring 1.

Figure 4D:
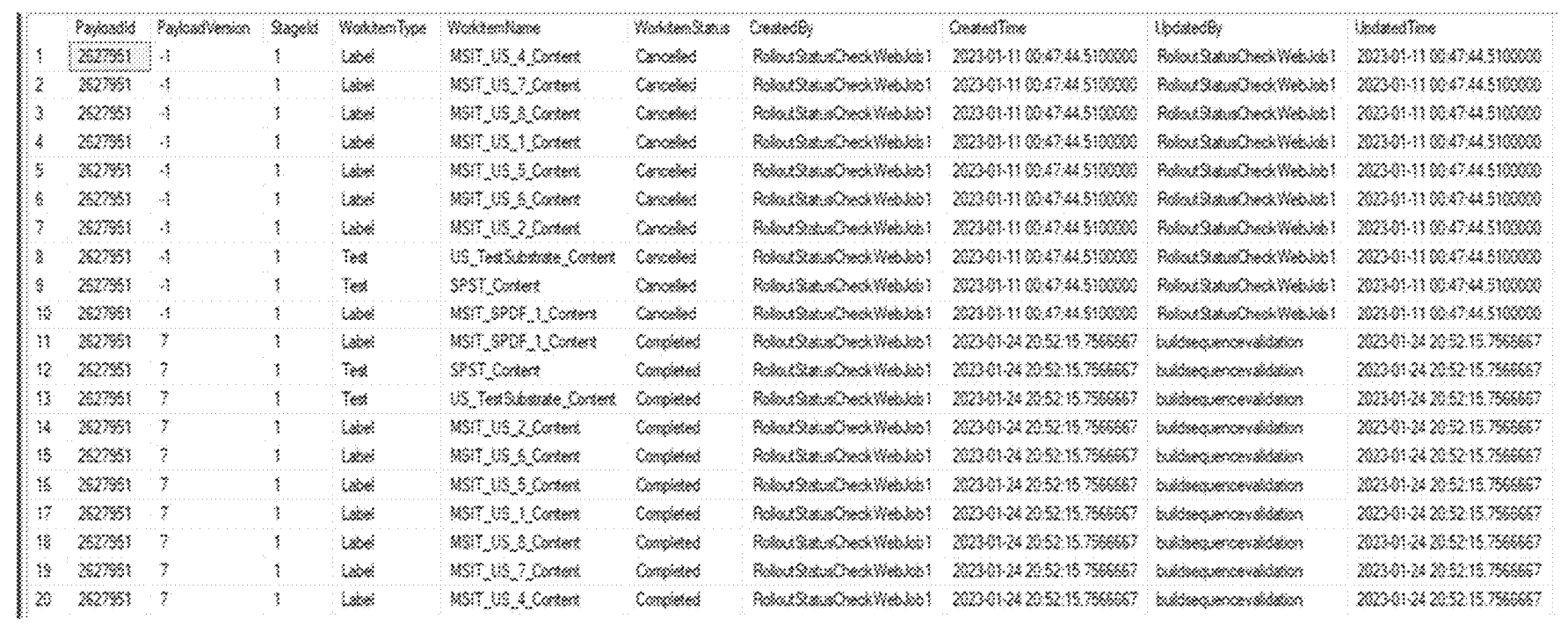

FIG. 4D depicts another rollout log illustrating other aspects of the techniques being described. In FIG. 4D, the update is being deployed just within stage 1. Within stage 1 are a number of farms. Each farm is identified by a WorkItemName in the 6th column. In the illustrated example, a common payload version was deployed in ten different farms, as recorded in the first 10 lines of the table. At this point, an issue or error was encountered. Accordingly, the payload version (PayloadVersion 1) was changed to negative in the first 10 lines of the table. The rollout service then deployed a new revised payload version (PayloadVersion 7) starting with the farm where the error was encountered (MSIT_SPDF_1_Content). The revised payload was then redeployed to each of the farms, in reverse order, that had received the previous payload version 1. The column, WorkItemStatus, thus shows a "cancelled" status for each of the earlier entries where payload version −1 was applied and then replaced by payload version 7.

Again, a complete picture of the deployment, including the application of payload versions 1 and 7 to each farm, is retained in the log. This methodology enables the support for multiple instances of the same work item name within the scope of a single payload. All existing data columns remain unchanged for this option. This option offers an effective universal Boolean flag (the negative payload version) that helps to identify the payload versions and farms affected by restart data objects. As described above, this restart workflow will enable payload stage and work item reset. Payloads will have the ability to re-issue active stages and pending work items according to the policy. Currently work item rules allow only a single instance of a specific work item in the database. The described technique changes the data model of the work item stage allocation and processing. Thus, work items are cancelled after restart and can be re-added in the stage iterations that follow.

Figure 5A:
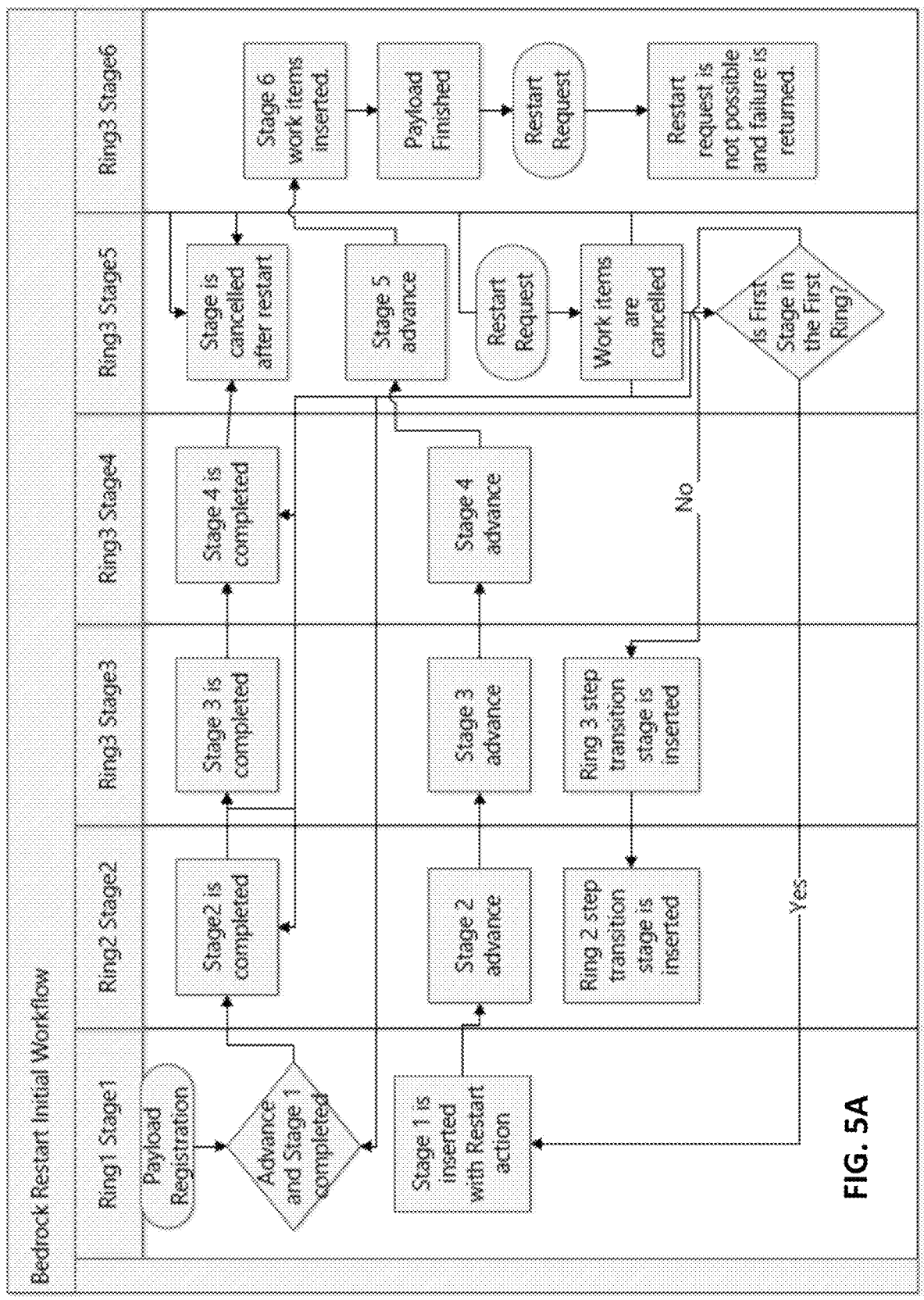
FIGS. 5A and 5B depict workflows for restarting and logging an update deployment according to principles described herein.

FIG. 5A illustrates an example of the restart workflow being described that allows iterations as needed. As shown in FIG. 5A, the payload is registered and the initial advance in Ring 1, Stage 1 is completed. In the illustrated example, stages 2-4 are completed without an issue. However, an issue is then encountered in Ring 3, Stage 5. Thus, the deployment to this stage is cancelled, in connection with the restart, if in a created or "in progress" state.

A restart is then requested. Work items are updated and removed from the insert lookup list for all stages. A determination is then made whether the first stage is in the first ring. If so, the restart begins with Stage 1, Ring 1 and each stage is then inserted or addressed with all corresponding items. If the first stage is not in Ring 1, then transition stages for Ring 2 and Ring 3 are inserted. When the payload is finished, any restart request cannot be implemented. In such a case a failure is returned.

Figure 5B:
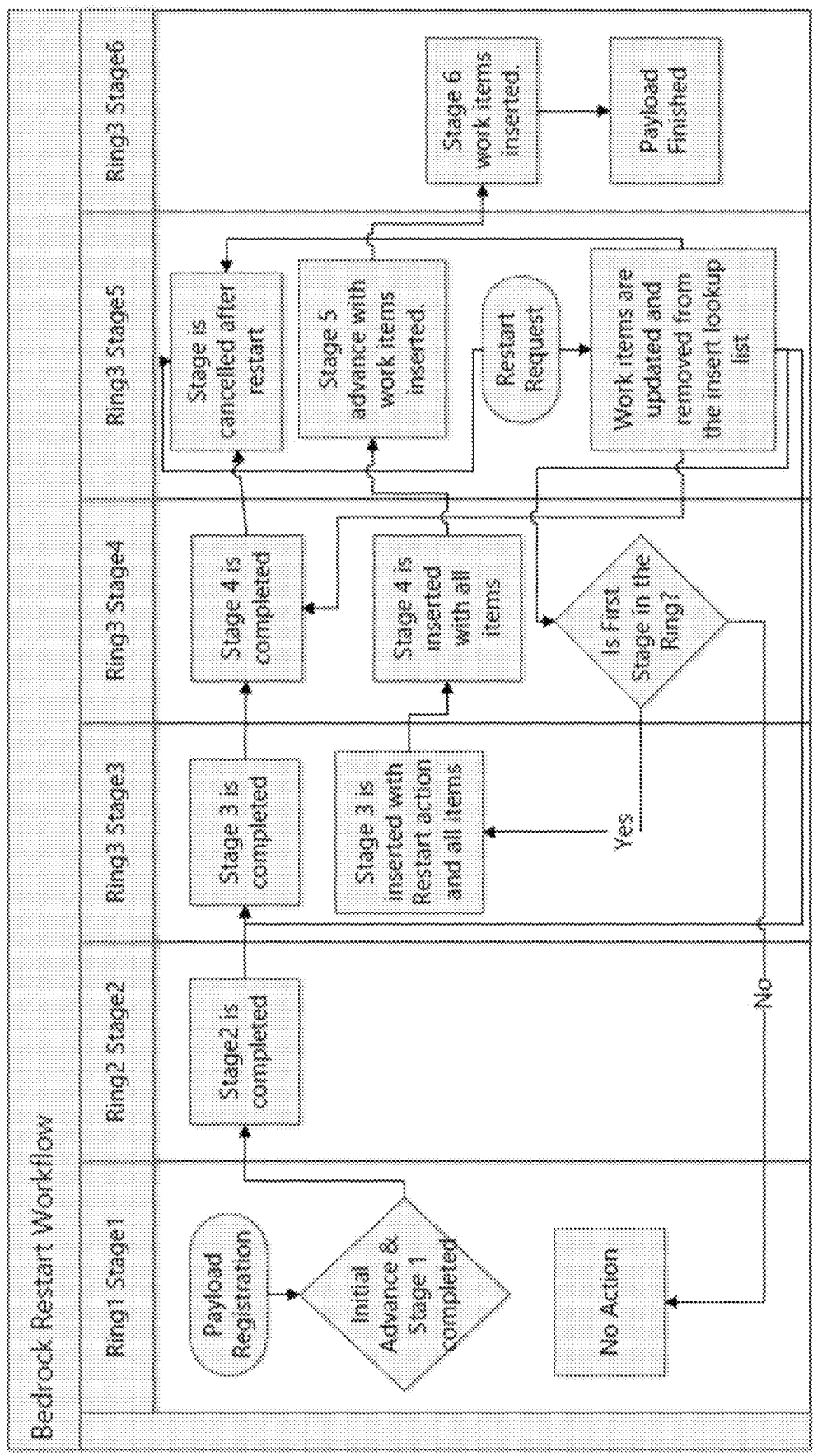

It is not always necessary for the restart to return to Ring 1, Stage 1. Thus, FIG. 5B illustrates an alternative version of this workflow in which Stage 3 is inserted as the first stage of the restart action. As shown in FIG. 5B, the restart initial action resets an active payload to the point of the original advance according to the policy across the rings. As shown in the second row, "Restarted Advancement," new stage data is inserted with RestartInitial request with and all corresponding pending work items. All completed, in progress or created stages are moved to the cancelled state as well as all work items. Payload advancement continues according to the policy. This feature will support Autopush or manual payload advancement.

This workflow for "payload restart initial" will support multiple restart initial actions. All cancelled stages and work items would be kept in the corresponding tables with the corresponding statuses and would be removed from the scope of the processing operations using this specific method.

FIGS. 5A and 5B provide for a number of different restart scenarios. Several examples are provided here.

Example 1

1. Payload is moved to the second stage in the last (Prod) ring and regression is detected.
2. Payload owner/Engineer suspends payload.
3. All work items and stages are completed as soon as the last advance message is received.
4. Payload owner initiates a restart action.
5. Payload is restarted and a new stage is inserted (Restart Initial inserts a new stage that corresponds to stage 1 of the policy. Restart action inserts the stage at the position of the first stage within the current ring) with incremented payload iteration ID. Payload stage state is created.
6. Work Items are inserted with the corresponding payload iteration id.
7. Service Bus message is sent with restart command.
8. Payload continues to advance according to the policy.

Example 2

1. Payload is moved to the second stage in the last (Prod) ring and regression is detected.
2. Payload owner/Engineer suspends payload—in case of restart initial. Suspend payload is not required for restart within the current ring.
3. All created work items and stages that are in the created state are cancelled. In progress work items must be completed.
4. Payload owner initiates a restart action.
5. Payload is restarted and a new stage is inserted (Restart Initial inserts a new stage that corresponds to stage 1 of the policy. Restart action inserts the stage at the position of the first stage within the current ring) with incremented payload iteration ID. Payload stage state is created.
6. Work Items are inserted with the corresponding payload iteration id.
7. Service Bus message is sent with restart command.
8. Payload continues to advance according to the policy.

Example 3

1. Payload is moved to the second stage in the last (Prod) ring and regression is detected.
2. Stage is in progress and work items are in progress.
3. Payload owner initiates a restart action.
4. Rollout Service returns an error specifying that payload needs to be suspended and all work items must be in completed or noOp state.
5. Payload owner suspends the payload.
6. Payload owner initiates restart action.

7. Rollout service detects presence of created and in progress work items in addition to current stage being in created or in progress state. Rollout Service returns an error stating that not all items are completed or in noOp state and that all activities must be completed cancelled on the orchestration engine side. This is a critical pre-requisite that may help us to solve blocking questions listed above.
8. Payload owner cancels deployment jobs on the orchestration engine side. Work items are updated to completed, noOp or cancelled state. Stage is finished and restart action is allowed.
9. Payload owner initiates restart action.
10. Payload is restarted and a new stage is inserted (Restart Initial inserts a new stage that corresponds to stage 1 of the policy. Restart action inserts the stage at the position of the first stage within the current ring) with incremented payload iteration ID. Payload stage state is created.
11. Work Items are inserted with the corresponding payload iteration id.
12. Service Bus message is sent if needed.
13. Payload continues to advance according to the policy.

FIG. 6A illustrates an alternative approach that, instead of using negative numbering, adds a new column for Stage State to the log table. In the example of FIG. 6A, an issue is encountered at stage 5 in ring 3. A transition to a restart is arranged during the next line which indicates an incremented payload version, but activity in stage 2, ring 3. The restart in this example is back to stage 1 of ring 2. Stage 2 has only one ring. In the next line of the log, the restart then beings in stage 1, ring 2 with payload version 7 and continues until the update is completed in stage 3 of ring 3.

In FIG. 6A, a new column for stage state is added. As shown in FIG. 6A, the stage state for the payload versions prior to the restart, including the transition, are marked as "Cancelled." The subsequent successful payloads after the restart are marked in the stage state column as "Finished." Thus, this solution similarly preserves a record or audit trail of all each stage of deployment before and after a restart. However, the log has to be modified to include and update the column for stage state.

Figure 6B:
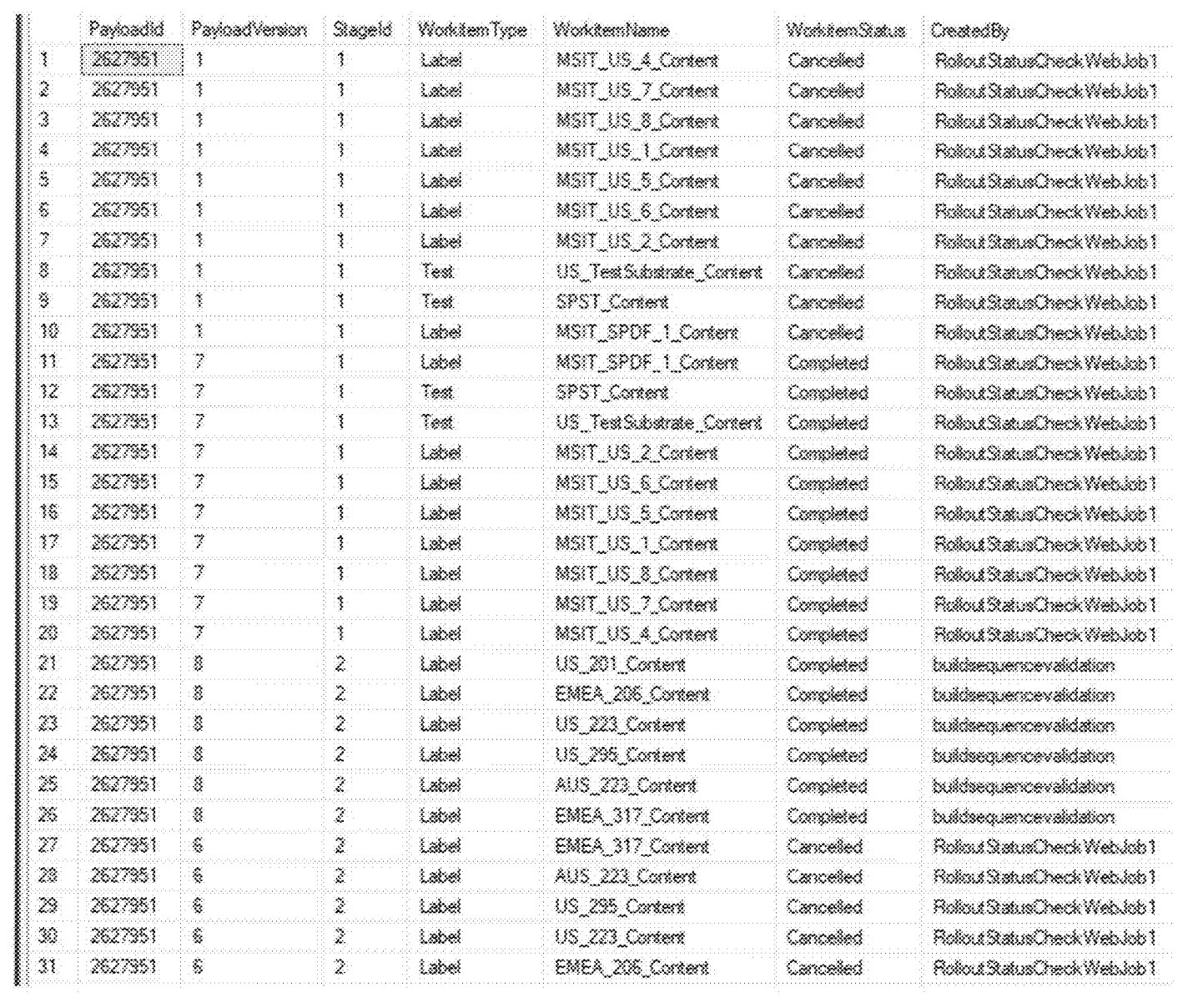

FIG. 6B illustrates this approach at the farm level. Here the new column is work item state or "WorkItemState" which shows the stage of a deployment for each work item or farm as "Cancelled" or "Completed." This item state option preserves the original payload version/payload iteration identifier but locks the item status. Cancelled items are locked and no longer modifiable. This is needed for work items version/state preservation. Stages and work items are going to continue to be added, but cancelled items are preserved for the desired audit trail. This solution option will need significant refactoring of the payload finished state, stage in progress and stage finished function. Additionally, the stage update and work item update functions will need to be changed according to the approach described here. Additional columns in this log to the right of what is illustrated possibly include "Created Time" for each entry, "UpdatedBy" (e.g., RolloutStatusCheck WebJob1 or build-sequence validation), "Updated Time," "Row Version" and an "Environment" identifier (e.g., MSIT).

Figure 7:
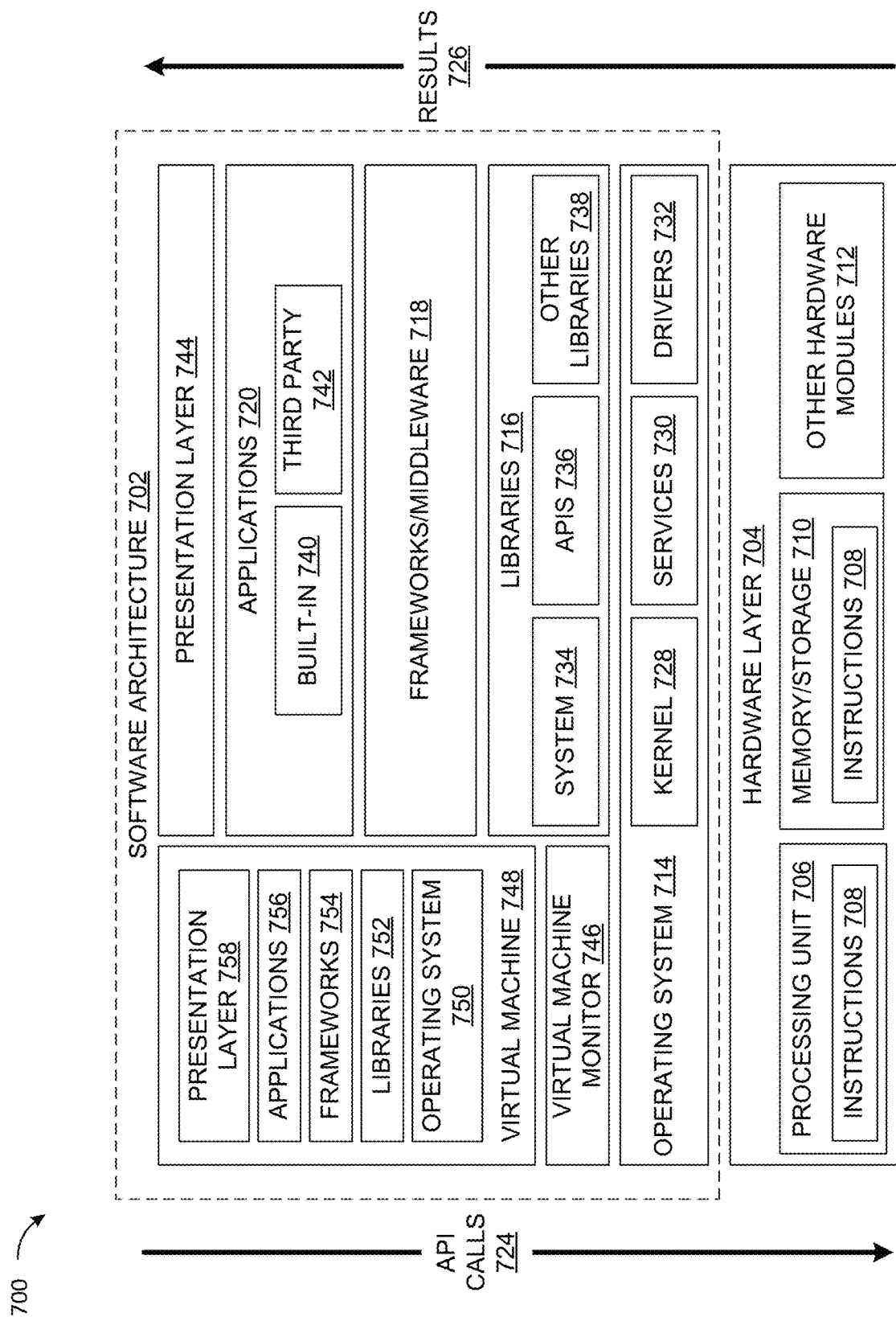
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. This software architecture may represent the software of the rollout service 301 or other component shown in FIG. 3B. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
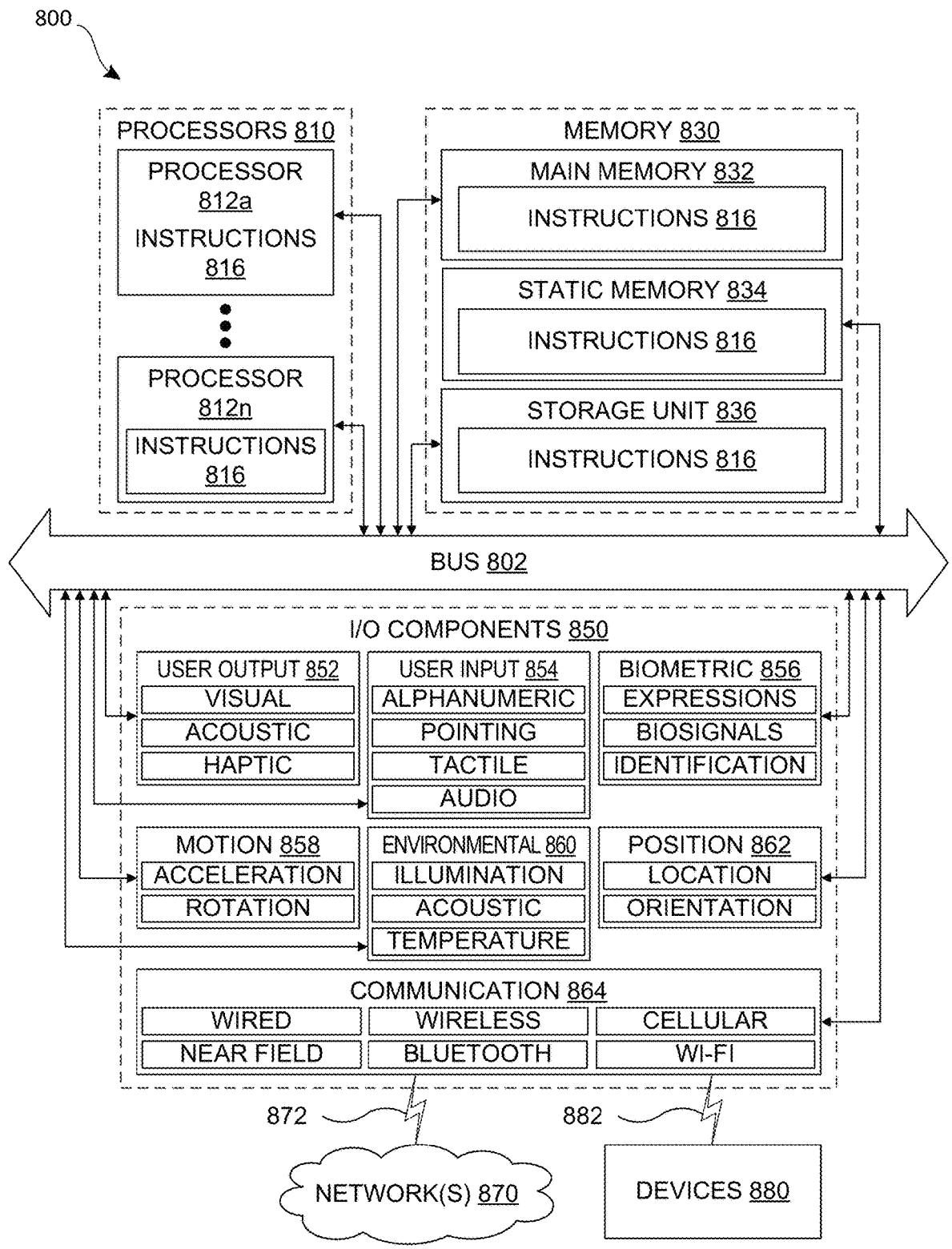
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. This example machine may represent the hardware of the rollout service 301 or other component shown in FIG. 3B.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812$a$ to 812$n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A logging system for an orchestration system that implements a rollout service to deploy updates to a cloud service, the system comprising:

an orchestrator service host computer hosting the rollout service;

a service bus connecting the orchestrator service host computer with a network on which the cloud service is provided; and a database to which the rollout service records a log of a deployment of an update, the log comprising an entry for each of a number of subsets of network components supporting the cloud service;

wherein each record in the log refers to a payload version deployed to a corresponding subset of the network components supporting the cloud service; and wherein, in response to detection of an issue with the deployment of the update in a particular subset of the network components, the rollout service retains a record in the log of each payload version deployed by changing a payload version number to be negative in each record of the log prior to a restart of the deployment back to an earlier subset of the network components with a new payload version to avoid the issue.

2. The logging system of claim 1, wherein each subset of network components corresponds to a stage within a ring of a userbase.

3. The logging system of claim 2, wherein the restart returns the deployment to a first ring and stage of the userbase.

4. The logging system of claim 2, wherein each record in the log comprises a stage identification and a ring identification.

5. The logging system of claim 1, wherein each subset of network components is a farm comprising a number of virtual machines.

6. The logging system of claim 1, wherein in response to detection of a subsequent issue with the deployment of the update, the rollout service continues to retain a record in the log of each payload version deployed by again restarting the deployment back to an earlier subset of the network components with a new payload version and again changing a payload version number to be negative in each record of the log prior to a current restart.

7. The logging system of claim 1, wherein each payload version comprises a difference in configuration, settings or metadata with other payload versions.

8. The logging system of claim 1, wherein, when implementing a restart, the rollout service adds one or more records to the log during a transition period before the restart in the earlier subset of the network components begins.

9. The logging system of claim 1, wherein the records in the log are organized in a table.

10. The logging system of claim 9, wherein the log comprises a second table for logging progress of an update at a farm or work item level, the second table comprising a column for work item status, each record in the second table before a restart being marked as cancelled for a corresponding work item status.

11. A method of logging deployment of an update to a cloud service with an update system comprising:

an orchestrator service host computer hosting an update rollout service;

a service bus connecting the orchestrator service host computer with a network on which the cloud service is provided; and a database to which the rollout service records a log of a deployment of an update, the log comprising an entry for each of a number of subsets of network components supporting the cloud service, the method comprising:

deploying the update to a next subset of components supporting the cloud service;

detecting whether there is an issue with deployment of the update in that subset;

in response to detecting an issue, transitioning to a restart including marking a payload version as negative in each record in a log of the deployment prior to the restart; and restarting the deployment at an earlier subset of components that had previously received a different payload version of the update.

12. The method of claim 11, wherein each subset of components corresponds to a stage within a ring of a userbase.

13. The method of claim 12, wherein restarting the deployment comprises returning the deployment to a first ring and stage of the userbase.

14. The method of claim 11, wherein each subset of components corresponds to a farm comprising a number of virtual machines.

15. The method of claim 11, further comprising:

in response to detecting a subsequent issue, again transitioning to a restart including marking a payload version as negative in each record in a log of the deployment prior to a current restart; and restarting the deployment at an earlier subset of components that had previously received a different payload version of the update.

16. The method of claim 11, wherein each payload version comprises a difference in configuration, settings or metadata with other payload versions.

17. The method of claim 11, further comprising, when implementing a restart, adding one or more records to the log during a transition period before the restart in the earlier subset of the components begins.

18. The method of claim 11, further comprising including in the log records for progress of an update at a farm or work item level comprising an entry in each record for work item status, wherein each record made before a restart is marked with a cancelled work item status.

19. A non-transitory computer readable medium, the medium comprising programming instructions that, when executed by a processor of an orchestrator service, cause the processor to log deployment of an update to a cloud service by:

deploying the update to a next subset of component supporting the cloud service;

detecting whether there is an issue with deployment of the update in that subset;

in response to detecting an issue, transitioning to a restart including marking a payload version as negative in each record in a log of the deployment prior to the restart; and restarting the deployment at an earlier subset of components that had previously received a different payload version of the update.

20. The non-transitory computer readable medium of claim 19 further comprising programming instructions to cause the processor to log the deployment by:

in response to detecting a subsequent issue, again transitioning to a restart including marking a payload version as negative in each record in a log of the deployment prior to a current restart; and restarting the deployment at an earlier subset of components that had previously received a different payload version of the update.

* * * * *